(12) United States Patent
Gasser

(10) Patent No.: US 6,435,609 B1
(45) Date of Patent: Aug. 20, 2002

(54) CAR BENCH SEAT

(75) Inventor: Anne Gasser, Stadthagen (DE)

(73) Assignee: Faurecia Autositze GmbH & Co. KG, Stradthagem (DE)

( * ) Notice: Subject to any disclaimer, the term of this patent is extended or adjusted under 35 U.S.C. 154(b) by 0 days.

(21) Appl. No.: 09/713,261

(22) Filed: Nov. 16, 2000

(30) Foreign Application Priority Data

Nov. 16, 1999 (DE) .......................... 199 54 930

(51) Int. Cl.⁷ ................................. B60N 2/44
(52) U.S. Cl. ................... 297/188.1; 297/144
(58) Field of Search .................. 297/188.09, 188.1, 297/144

(56) References Cited

U.S. PATENT DOCUMENTS 2,804,122 A * 8/1957 Baum ..................... 297/188.1
5,720,514 A * 2/1998 Carlsen et al. ........... 297/188.1
5,848,820 A * 12/1998 Hecht et al. .............. 297/188.1
6,135,549 A * 10/2000 Demick et al. ............. 297/144

FOREIGN PATENT DOCUMENTS

DE 43 43 242 A 1 6/1995

* cited by examiner

Primary Examiner—Peter R. Brown
(74) Attorney, Agent, or Firm—Connolly Bove Lodge & Hutz, LLP

(57) ABSTRACT

A car bench seat provided with a seat part and a backrest, having a depositing unit, which can be swung out from its storage position wherein it is accommodated within the seating profile in the usage position in which depositing unit is freely accessible. The depositing unit is connected by means of connecting rods with a seat part area, which can be folded forward along a stationary front axis. The depositing unit is stored during the storage position under this seat part area, which can be folded forward.

9 Claims, 5 Drawing Sheets

CAR BENCH SEAT

FIELD OF THE INVENTION

The invention relates to a car bench seat with a seat part and a backrest. More specifically, the seat has a swing out depositing unit within the seating profile.

BACKGROUND OF THE INVENTION

A depositing table that can be stowed away is accommodated in the back rest area of the middle seat of a car bench seat of a known type (DE 43 43 242 A1). After the backrest area has been folded forward, the depositing unit can be swivelled out with a supporting arm around the vertical axle into the usage position. The storage of the depositing unit inside the back support reduces the height of the upholstery support, which reduces the seating comfort in the middle seat. When the depositing unit is also constructed as an armrest, the arm depositing area can be provided only with a limited amount of upholstery. The opening, which remains uncovered during the use of the depositing unit in the backrest, also reduces the esthetic appearance of the car bench seat.

SUMMARY OF THE INVENTION

Based on this status of prior art, the task of this invention is to provide a car bench seat, which can be constructed in the above-mentioned known manner, so that the seating comfort is not reduced and so the backrest bench seat is seen in the customary view also when the depositing unit is folded out.

The solution of this task is provided in accordance with the characteristics disclosed in patent claim 1.

The upholstering of the seat part area will not be affected by the depositing unit, which is stored below the seat upholstery. The depositing unit, which is stored away in this manner, is not visible and it does not attract attention to any visible changes in the seat part area in the usage position. When the depositing unit is folded out, a seat part area, which is folded back in its initial position, covers the storage position so that an impression disturbing the esthetic appearance will not be caused by this. Also, the seating comfort will not be influenced by the stored depositing unit.

A preferred embodiment of the invention will be further described based on the subordinated claims.

BRIEF DESCRIPTION OF THE DRAWINGS

The following is a preferred embodiment form of the invention based on the enclosed figures, which are described in detail. The figures indicate.

DETAILED DESCRIPTION OF THE INVENTION

Figure 1:
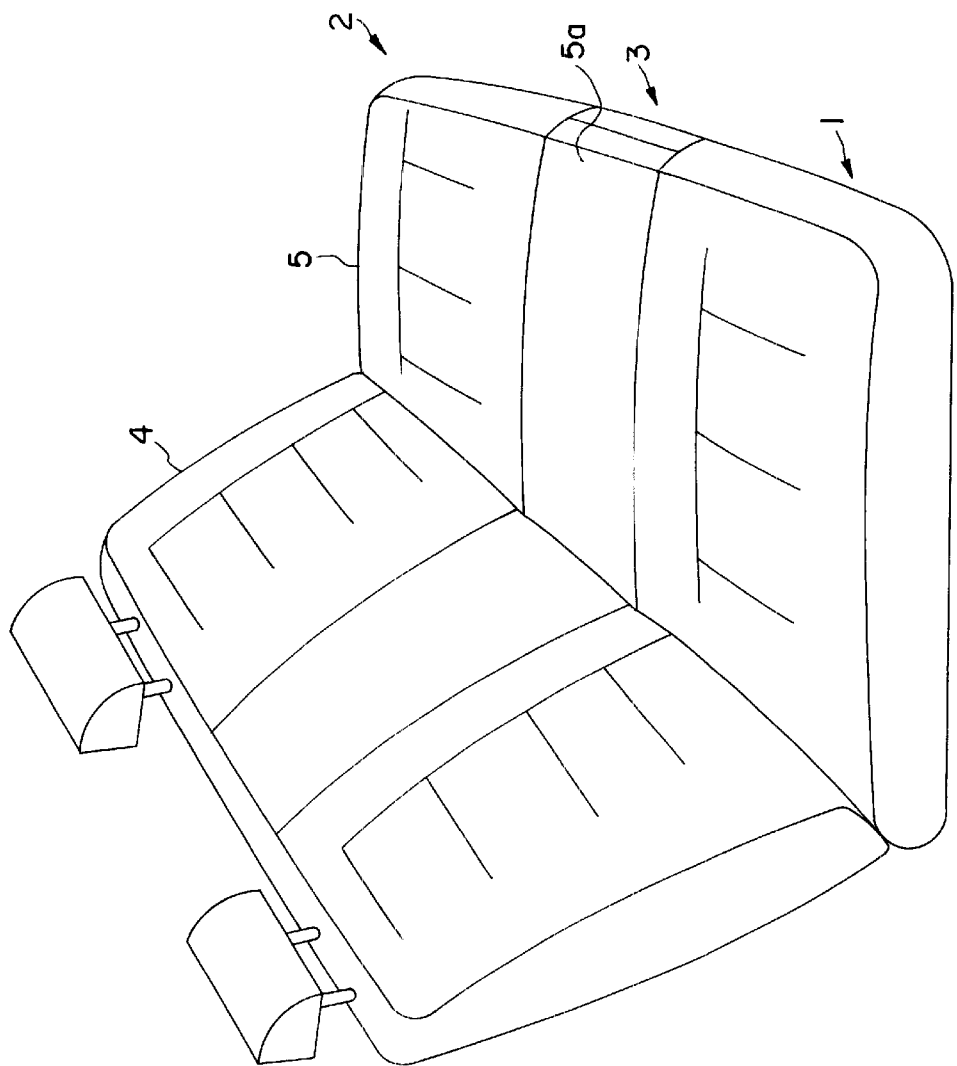
FIG. 1—a perspective rendering of a rear bench seat.

A car bench seat, for instance a rear bench seat, is provided with a backrest 4 and a seat part 5. The rear bench seat is further divided into two outer seating surfaces 1 and 2 and a middle seat 3, which is located between these surfaces. The middle seat 3 comprises a seat part area 5a, which can be folded forward independently of the neighboring seat part area from its usage position around a front axle.

Figure 2:
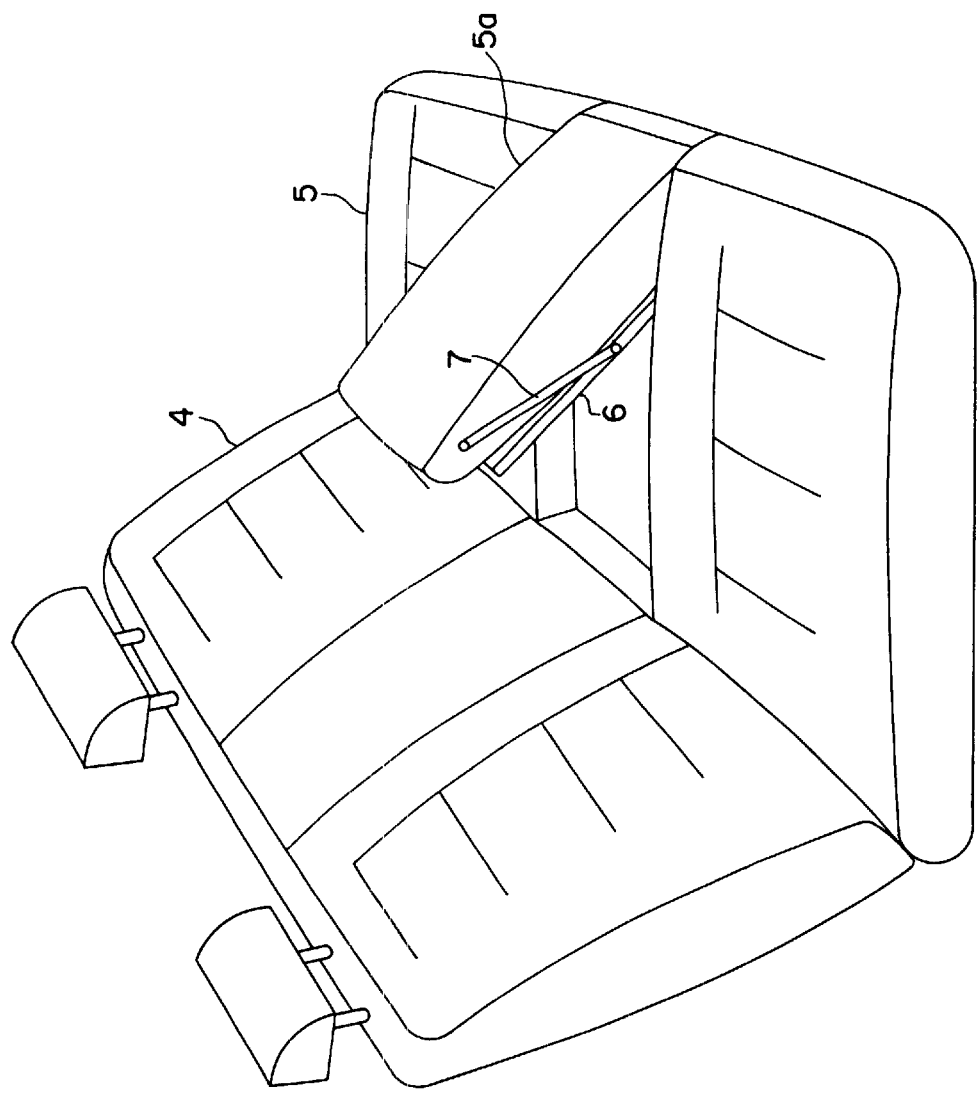
FIG. 2—a perspective rendering of the rear bench seat according to FIG. 1 provided with a middle seat part moved upward.

The opposite sides of connecting rods 7 are jointed so that they can be swivelled as shown in FIG. 2 at the rear end of this seat part area 5a to the seat part area. Connecting rods 7 are connected with a depositing unit 6, which is constructed in the form of a table board. When the seat part area is in the folded position, the stored depositing unit 6 lies on its bottom side. Connecting rods 7 are extended in the area between the neighboring seat part areas.

Figure 3:
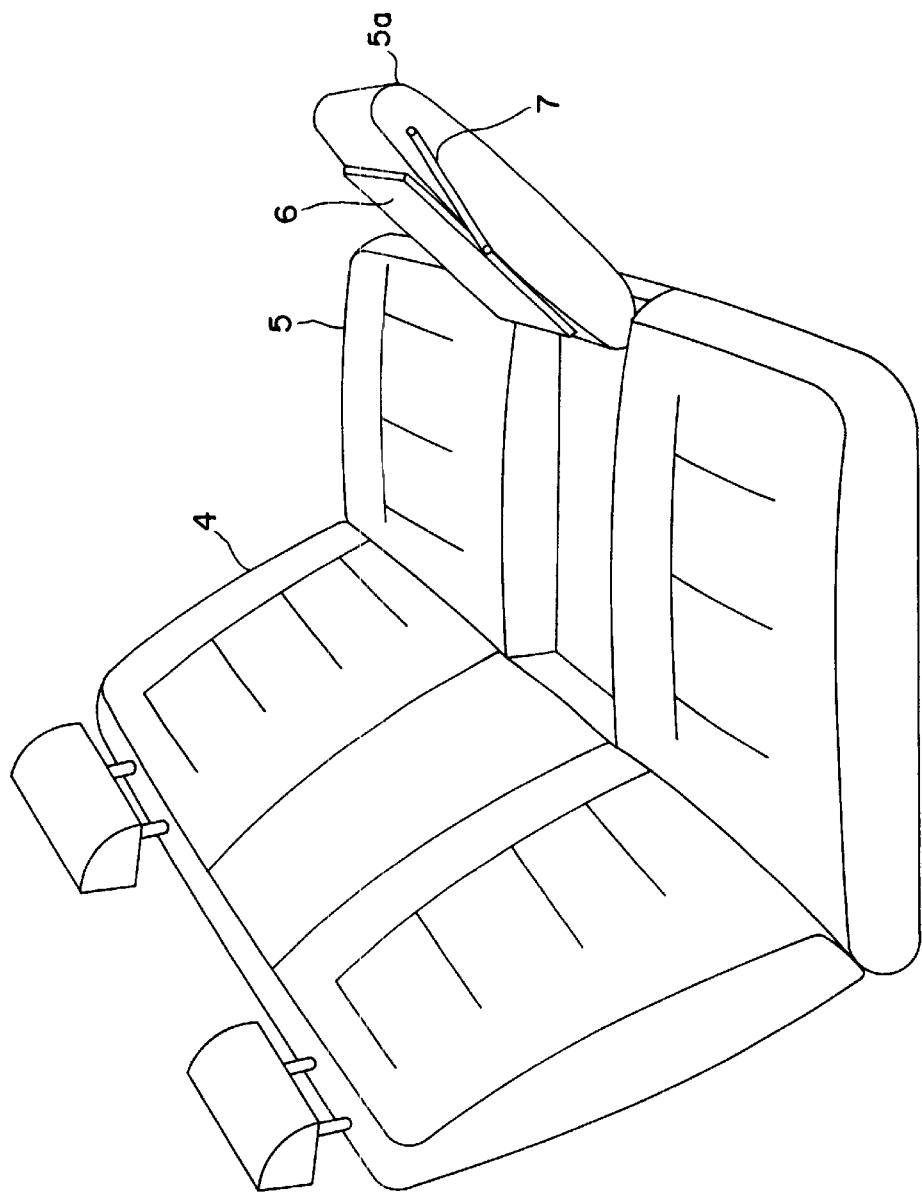
FIG. 3—a perspective rendering of the rear bench seat according to FIG. 1 wherein the middle seat part is fully folded forward.
Figure 4:
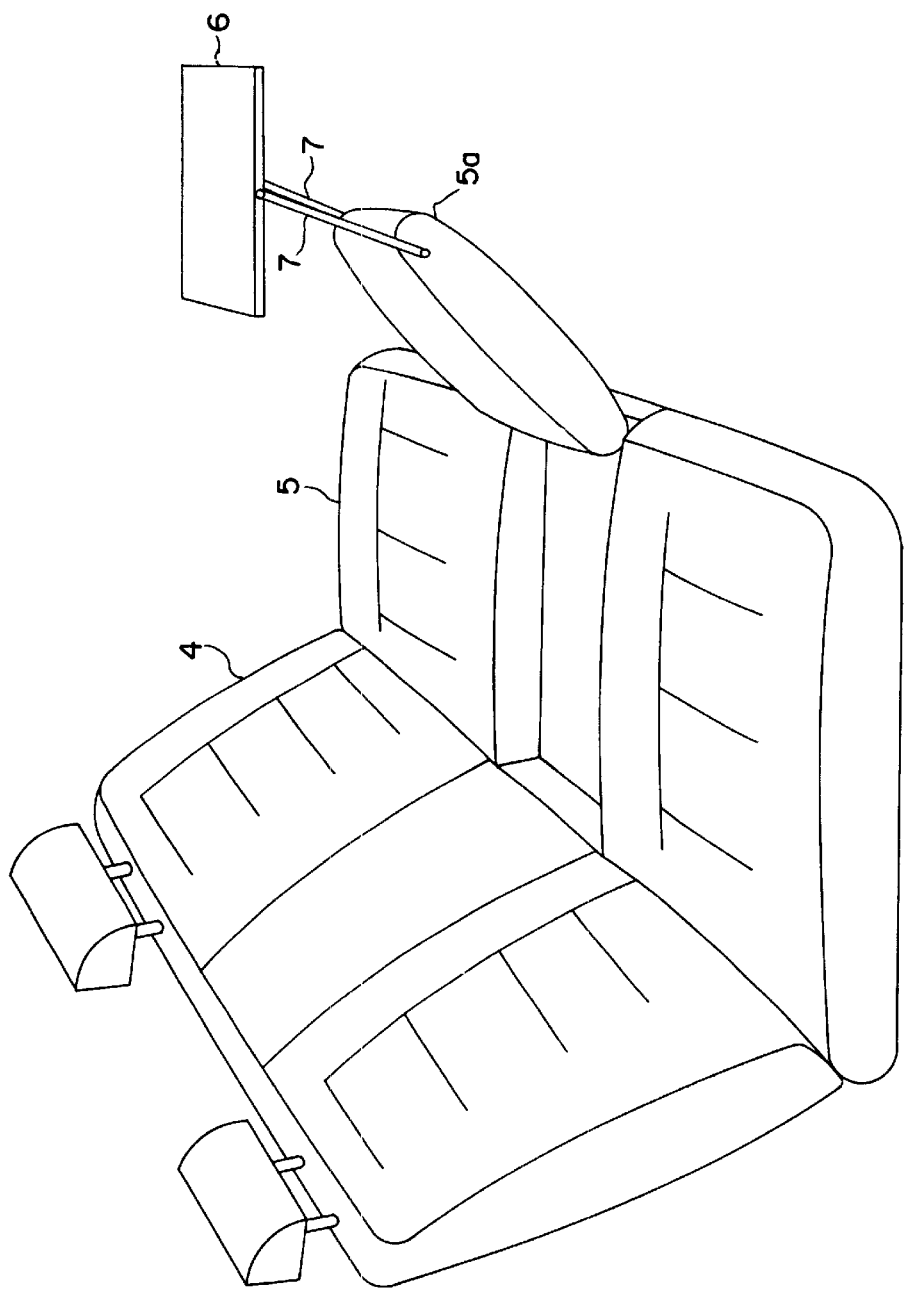
FIG. 4—a perspective view of the rear bench seat according to FIG. 1 with the depositing unit folded out.
Figure 5:
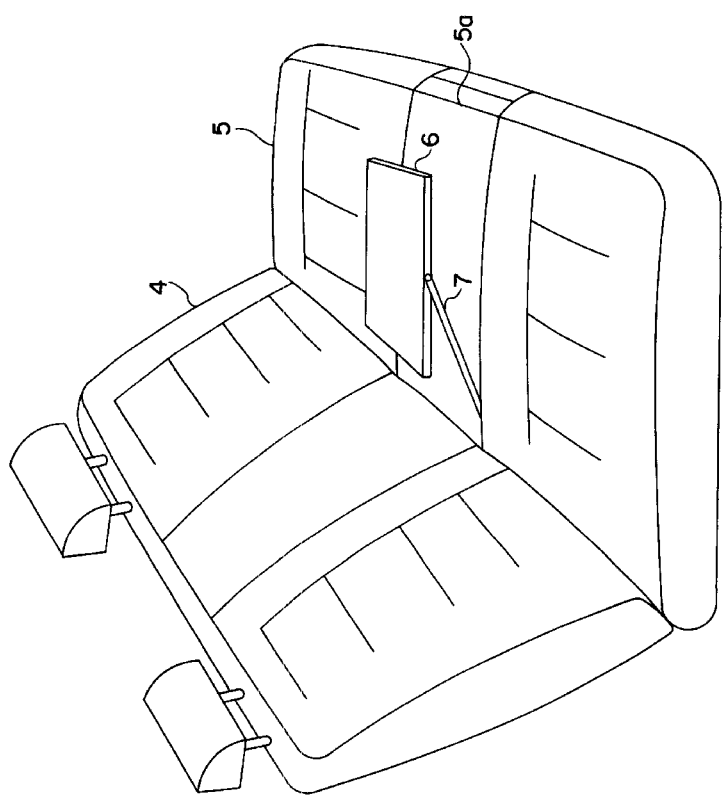
FIG. 5—a perspective view of the rear bench seat with a middle seat part folded back and in the swivelled position of the depositing unit.

When seat part area 5a is fully unfolded as shown in FIG. 3, depositing unit can be swivelled out from the bottom side to the front side. As shown in FIG. 4, depositing unit 6 will be at that point swivelled relative to connecting rods 7 around a horizontal axis. As soon as depositing unit 6 is folded away from the bottom side of the seat part area 5a, this seat part area 5a can be folded back again it is original position. Connecting rods 7 will be at this point swivelled into their rear position, next to the rear edge of the seat part area 5a, around the axis in this seat part area. The swivelling of connecting rods 7 can be limited by the impact in a stopping position. When fully folded back into the original position in the seat part area 5a as shown in FIG. 5, connecting rods 7 are projecting upward from seat part 5 in the driving direction inclined at an angle. Connecting rods 7 are maintained by their own weight and the weight of the depositing unit adjacent to the above-mentioned position. Table board 6 is swung into the horizontal position. Table board 6 will be locked in this position with respect to connecting rods 7.

The locking can be achieved with clamping elements or latching elements, not indicated in the figure and known per se. The locking can be also enabled in a different folding angle depending on the purpose of the use of depositing unit 6. In order to increase the surface area of the depositing unit 6, an additional depositing surface area can be also provided on depositing unit 6 stored in it in such a way so that it can be folded out or pulled out. A sufficient amount of space is provided for the accommodation of depositing unit 6 and potentially also for additional depositing regions below middle seat 3. When seat part area 5a is folded into its original position after depositing unit 6 has been swung out, an undisturbed optical impression of seat part 5 is restored again.

What is claimed is:

1. A car bench seat provided with a lower seat part (5) and a backrest (4) having a depositing unit (6), wherein the depositing unit is connected to a seat part area with at least one set of connecting rods, and is stored under the seat part area in a recess of the lower seat part, wherein the seat part area includes a front end portion and a rear end portion separated by two side portions, and the seat part area rotates out of the lower seat part about an axis proximate to the front end portion.

2. The car bench seat according to claim 1, wherein the at least one set of connecting rods are disposed along the side portions of the seat part area.

3. The car bench seat according to claim 1, wherein one end of the connecting rods connect with the rear end portion of the seat part area.

4. The car bench seat according to claim 1, wherein the connecting rods include clamping or locking elements that lock the connecting rods at different folding angles with respect to the lower seat part.

5. The car bench seat according to claim 1, wherein the depositing unit includes clamping or locking elements that lock the connecting rods at different folding angles with respect to the depositing unit.

6. The car bench seat according to claim 1, wherein the depositing unit locks in a horizontal position.

7. The car bench seat according to claim 1, wherein the depositing unit function as a table area.

8. The car bench seat according to claim 7, wherein the table area includes a secondary table area to provide an additional depositing surface.

9. The car bench seat according to claim 1, wherein the seat part area is capable of rotating about the axis proximate to the front end portion into a recess of the lower seat part with the depositing unit disposed above the seat part area through rotation of the connecting rods about an axis proximate to the rear end portion of the seat part area.

* * * * *